US006943668B2

(12) United States Patent
Gaus, Jr. et al.

(10) Patent No.: US 6,943,668 B2
(45) Date of Patent: Sep. 13, 2005

(54) APPARATUS AND METHOD FOR RECONFIGURING A POWER LINE COMMUNICATION SYSTEM

(75) Inventors: Richard Charles Gaus, Jr., Burnt Hills, NY (US); Nick Andrew Van Stralen, Ballston Lake, NY (US); John Erik Hershey, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 297 days.

(21) Appl. No.: 09/681,920

(22) Filed: Jun. 26, 2001

(65) Prior Publication Data

US 2002/0196128 A1 Dec. 26, 2002

(51) Int. Cl.[7] .............................................. H04M 11/04
(52) U.S. Cl. ........................... 340/310.02; 340/870.02; 370/203
(58) Field of Search ....................... 340/310.02, 310.01, 340/310.05, 310.06, 539, 870.02, 870.01; 370/203, 204, 206, 207, 208; 375/222

(56) References Cited

U.S. PATENT DOCUMENTS

| | | | | |
|---|---|---|---|---|
| 4,821,292 A | * | 4/1989 | Childress ..................... 375/319 |
| 5,239,575 A | | 8/1993 | White et al. ................. 379/107 |
| 5,243,338 A | | 9/1993 | Brennan, Jr. et al. ... 340/870.02 |
| 5,252,976 A | | 10/1993 | Miho et al. .................. 341/163 |
| 5,331,581 A | | 7/1994 | Ohkubo et al. ............. 364/717 |
| 5,519,692 A | * | 5/1996 | Hershey et al. ............... 370/18 |
| 5,519,725 A | | 5/1996 | Hershey et al. ............. 375/216 |
| 5,553,094 A | | 9/1996 | Johnson et al. ............. 375/200 |
| 5,563,906 A | | 10/1996 | Hershey et al. ............. 375/200 |
| 5,568,508 A | | 10/1996 | Hershey ...................... 375/200 |
| 5,568,522 A | * | 10/1996 | Hershey et al. ............. 375/346 |
| 5,708,966 A | | 1/1998 | Al-Dhahir et al. ......... 455/13.4 |
| 5,821,637 A | * | 10/1998 | Shimada et al. .............. 307/91 |
| 5,844,949 A | | 12/1998 | Hershey et al. ............. 375/346 |
| 5,897,607 A | | 4/1999 | Jenney et al. ................. 702/62 |
| 5,903,594 A | | 5/1999 | Saulnier et al. ............. 375/200 |
| 5,933,092 A | | 8/1999 | Ouellette et al. ...... 340/870.02 |
| 5,977,650 A | * | 11/1999 | Rickard et al. ................ 307/3 |
| 6,040,769 A | * | 3/2000 | Payne ......................... 340/506 |
| 6,304,761 B1 | * | 10/2001 | Tsunehiro .................. 340/7.32 |

OTHER PUBLICATIONS

"Modest but Useful Erasure Technique for DPSK," JE Hershey; RT Hoctor; AA Hassan, Electronics Letters, Jan. 2, 1997, vol. 33, No. 1, pp. 21–22.

"GHM Aggregator," CM Puckette et al., U.S. Appl. No. 09/476,821, filed Jan. 3, 2000, allowed Aug. 20, 2001.

* cited by examiner

Primary Examiner—Phung Nguyen
(74) Attorney, Agent, or Firm—Fletcher Yoder (57) ABSTRACT

A geometric harmonic modulation (GHM) communication system communicates GHM signals on a power line of a reconfigurable network. The GHM communication system includes a master controller connected to the power line for transmitting GHM signals on the power line. A boundary component is also connected to the power line. A GHM addressable device is connected to the power line between the master controller and the boundary component. The GHM addressable device defines a boundary of a network region based on the GHM signals transmitted over the power line.

26 Claims, 7 Drawing Sheets

APPARATUS AND METHOD FOR RECONFIGURING A POWER LINE COMMUNICATION SYSTEM

BACKGROUND OF INVENTION

This invention relates generally to a power line communication system and more particularly, to a power line communication system that uses signal attenuation caused by boundary components to create regions in the power line communication system.

Typically, geometric harmonic modulation (GHM) allocates signaling energy into lobes, tones or different frequencies that are evenly spaced. The GHM signaling waveforms are true spread spectrum signals in that the signal bandwidth (i.e., the bandwidth from the lowest frequency tone to the highest frequency tone) exceeds the information bandwidth conveyed by the GHM transmission. GHM communication is well suited for power line communication applications since the GHM signals can be transmitted through power line components such as distributors and transformers. However, GHM signals can become severely attenuated by capacitor banks located on the power line. In addition, attenuation can be caused when a GHM signal passes through underground cable or when the GHM signal passes an underground cable branch because the underground cables attenuate the GHM signals similar to capacitor banks. The capacitor banks and the underground cables can also be referred to as boundary components. The signal attenuation caused by the capacitor banks and underground cables is undesirable because the attenuation adversely affects the efficiency of the GHM transmission and the integrity of the information being transmitted.

Typically, communication networks for automated meter reading and load control include a master station located at an electrical substation. The master station communicates with meters located at varying distances along the power line from the electrical substation. In these conventional communication networks, the electric utility components (i.e., distribution transformers and capacitor banks, both overhead and underground) are in place and unchanged. It should be appreciated in these conventional communication networks that traps can be located at the capacitor banks. With these conventional communications networks, information is typically transmitted from the master stations to all meters communicatively coupled to the master station. Therefore, even if certain operation are only to be performed by specific meters within a specific region, all the meters coupled to the master station receive the information and process at least a portion of the information to determine whether the specific meter is being addressed.

As such, it is desired to provide a communication network that utilizes the attenuation effects associated with underground cables and capacitor banks. Further, it is also desired to provide a network that enables regionalized and local control of a set of meters to enhance the communication network efficiency using the attenuation effects caused by the boundary components.

SUMMARY OF INVENTION

In one representative embodiment, a GHM communication system is provided for communicating GHM signals on a power line of a reconfigurable network. The GHM communication system comprises a master controller connected to the power line. The master controller comprises a GHM receiver and a GHM transmitter for transmitting and receiving GHM signals on the power line. A local controller is connected to the power line, and the local controller comprises a GHM receiver for receiving GHM signals from the power line. The local controller also defines a boundary of a first network region based on the GHM signals transmitted over the power line. A boundary component is connected to the power line. A GHM addressable device is connected to the power line between the master controller and the boundary component. The GHM addressable device comprises a GHM receiver for receiving GHM signals transmitted over the power line, and a microprocessor connected to the GHM receiver for interpreting the GHM signals and defining a boundary of a second network region based on the GHM signals transmitted over the power line.

In another representative embodiment, a method for reconfiguring a reconfigurable network on a power line is provided. The method comprising the steps of transmitting a GHM signal on the power line. The GHM signal is received at a GHM addressable device. The GHM signal is interpreted at the GHM addressable device. A network region in the reconfigurable network is established based on the step of interpreting the GHM signal, and the GHM addressable device controls defining a boundary of the network region based on the GHM signals transmitted over the power line.

DETAILED DESCRIPTION

Figure 1:
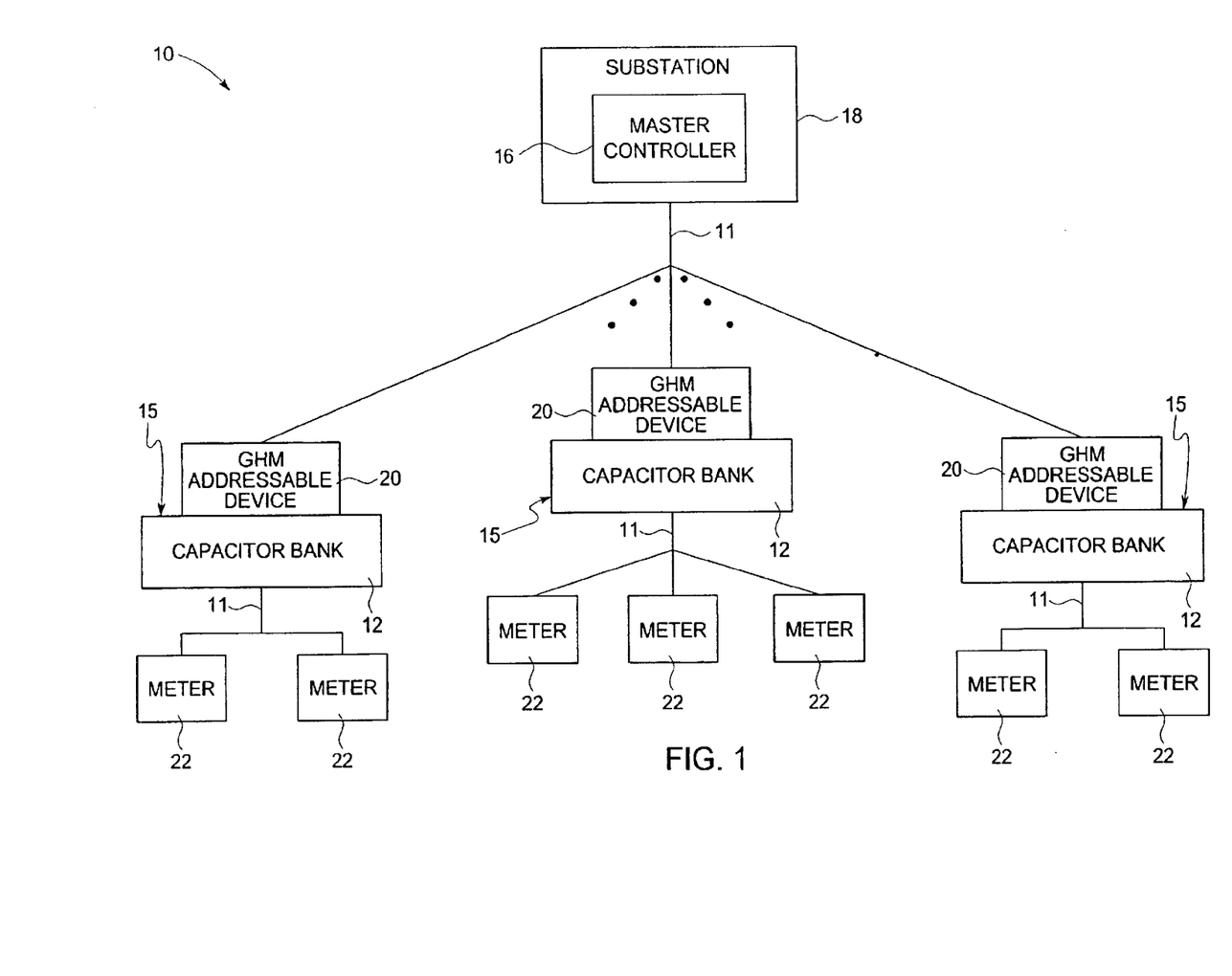
FIG. 1 is a block diagram view of one representative embodiment of a reconfigurable network.
Figure 2:
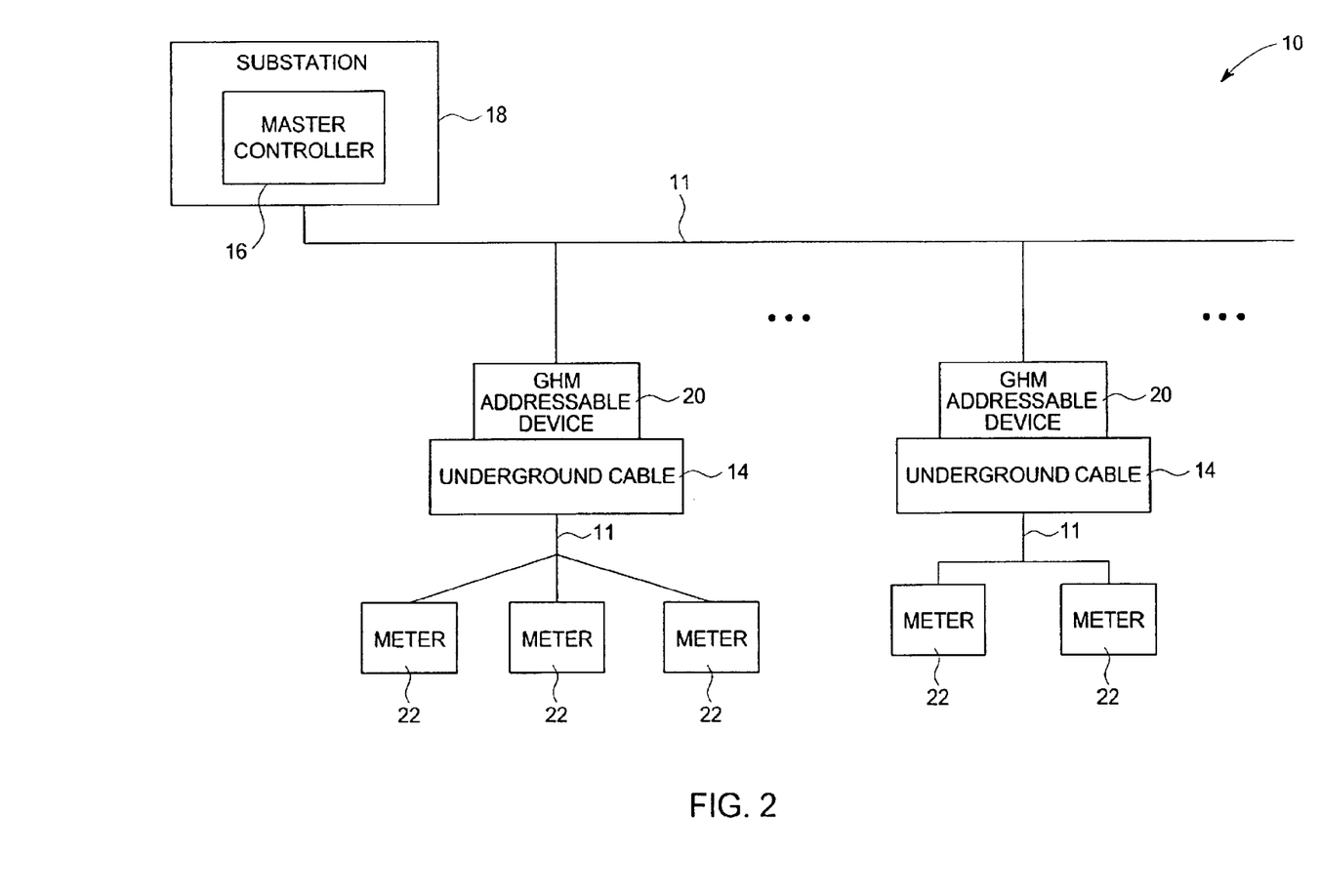
FIG. 2 is a block diagram view on another representative embodiment of a reconfigurable network.
Figure 3:
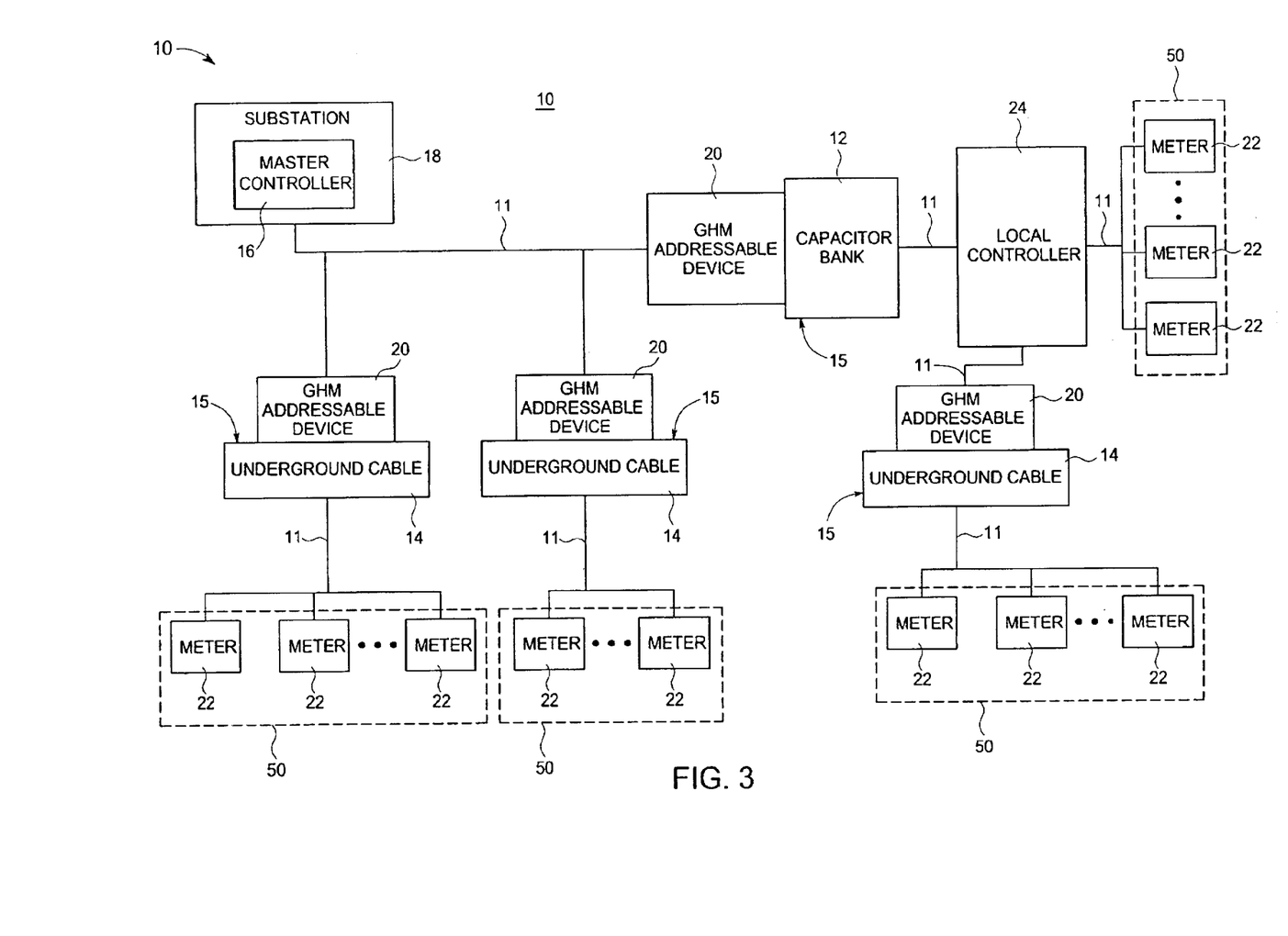
FIG. 3 is a block diagram of one representative embodiment of a reconfigurable network using local controllers.

In FIGS. 1–3, a reconfigurable network 10 is provided that communicates geometric harmonic modulation (GHM) signals via a power line 11. The reconfigurable network 10 includes various boundary components 15, such as, for example capacitor banks 12 and underground cables 14, that are connected to the power line 11. A GHM addressable device 20 is provided and uses the attenuation effects on the GHM signals caused by the boundary components 15 to create regions 50 (FIG. 3) in the reconfigurable network 10. In one embodiment, the reconfigurable network 10 can utilize the natural attenuations associated with the boundary components 15 during transmission of the GHM signals over the power line 11 to form the regions 50 (FIG. 3). Further, rather than viewing the boundary components 15 as barriers to transmission of the GHM signals, the reconfigurable network 10 takes advantage of the attenuation characteristics of the boundary components 15 to form regions 50 (FIG. 3) within the reconfigurable network 10.

As shown in FIG. 1, one representative embodiment of the reconfigurable network 10 includes a substation 18 that is connected to at least one boundary component 15 via the power line 11. The substation 18 includes a master controller 16 that transmits and receives GHM signal via the power line 11. A GHM addressable device 20 is connected to the power line 11 between the substation 18 and the boundary component 15. In the representative embodiment shown in FIG. 1, the boundary components 15 comprise capacitor banks 12. As shown in FIG. 1, the power line 11 continues past the GHM addressable device 20 and the capacitor bank 12 to supply power to various consumers. Meters 22 are connected to the power line 11 and can be positioned at the consumer location. It should be appreciated that any number of capacitor banks 12 can be connected to the substation 18 via the power line 11.

As shown in FIG. 2, another representative embodiment of the reconfigurable network 10 includes a substation 18 wherein the boundary components 15 comprise underground cables 14. In this embodiment, the underground cable 14 supplies power from the substation 18 via the power line 11 to various consumers. At the consumer location, a meter 22 is located and connected to the power line 11 from the underground cable 14. In the representative embodiment shown in FIG. 2, the overhead power line 11 branches to the underground cable 14, and the overhead power line 11 continues on past the branch to the underground cable 14. It should be appreciated that any number of underground cables 14 can be connected to the substation 18 via the power line 11.

In FIG. 3, a representative embodiment of a reconfigurable network 10 includes a local controller 24. In this embodiment, a substation 18 is connected to the power line 11, and the substation 18 includes a master controller 16. The power line 11 is connected via a GHM addressable device 20 to various boundary components 15, such as, for example, capacitor banks 12 and underground cables 14. Through the GHM addressable device 20, the underground cable 14 and the capacitor banks 12 are also connected via the power line 11 to meters 22. Power from the substation 18 is supplied via the power line 11 to various consumer locations. At these various consumer locations, meters 22 are located and connected to the power line 11. In addition, as shown in FIG. 3, the local controller 24 can be directly connected via the power line 11 to the substation 18. The local controllers 24 and the GHM addressable devices 20 are provided to control operation within a particular region 50 once the master controller 16 has established the regions 50, as described herein below.

Figure 4:
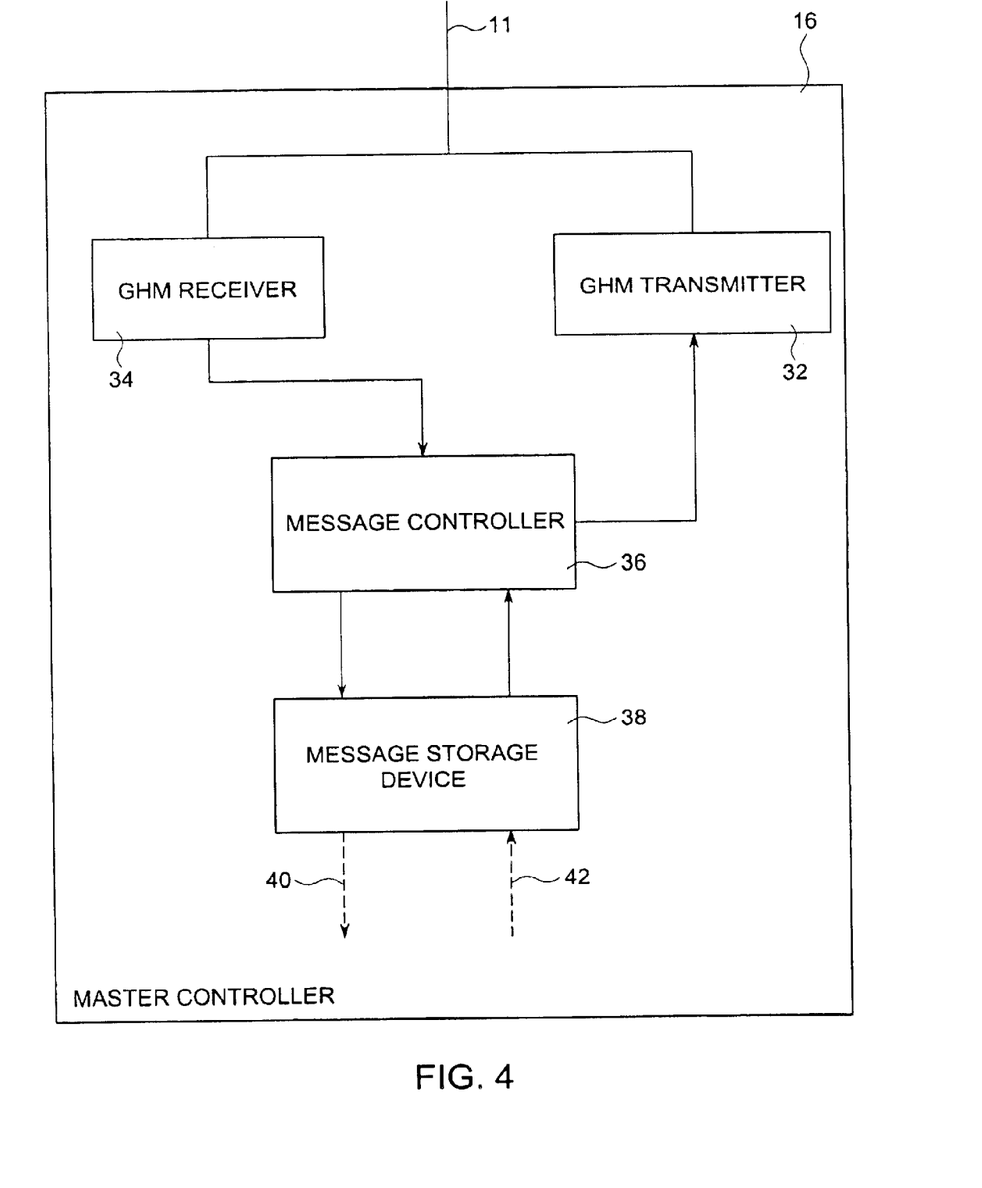
FIG. 4 is a block diagram of one representative embodiment of a master station.

In FIG. 4, master station 16 includes a GHM transmitter 32 and GHM receiver 34. In this embodiment, the GHM transmitter 32 and the GHM receiver 34 are configured for GHM communications. In one embodiment, the GHM transmitter 32 and the GHM receiver 34 both comprise a modem that is capable of receiving and sending GHM signals via the power line using a GHM protocol. The master controller 16 further includes a message controller 36 that is coupled to GHM transmitter 32 and GHM receiver 34. The message controller 36 executes a protocol for controlling communications as described herein below. In one exemplary embodiment, the message controller 36 comprises a microprocessor. A message storage device 38 is coupled to the message controller 36. In one embodiment, the message storage device 38 stores information received by and transmitted from the master controller 16. In another exemplary embodiment, the message storage device 38 comprises a non-volatile memory, such as, for example, an electronically erasable and programmable read only memory. In even another exemplary embodiment, the message storage device 38 comprises a random access memory (RAM). It should be appreciated that, in another embodiment, the message storage device 38 can be included in the message controller 36. It should also be appreciated that, in one embodiment, the local controllers 24 can have the same hardware configuration as the master controller 16 shown in FIG. 4.

Also shown in FIG. 2, a data bridge outbound link 40 and a data bridge inbound link 42 are coupled to message storage device 38 so that data can be supplied to and obtained from the master controller 16 from an outside source, such as, for example, a power company main station. In one embodiment, the data bridge outbound link 40 and the data bridge inbound link 42 comprise radio frequency links that communicate information between the master controller 16 and the outside source via a radio frequency connection. In another embodiment, the data bridge outbound link 40 and the data bridge inbound link 42 comprise a telecommunications connection, such as, for example, a telephone connection, such that information can be transmitted to the master controller 16 via the telecommunications connection. In even another embodiment, the data bridge outbound link 40 and the data bridge inbound link 42 can be connected to power line 11 and information can be communicated between the master controller 16 and the outside source via the power line 11, and in this embodiment, the outside source must also be connected to the power line 11.

In one embodiment, the GHM transmitter 32, GHM receiver 34, message controller 36, and message storage device 38 are powered directly from power obtained from the substation 18 via the power line 11. In another embodiment, the master controller 16 also comprises a battery back-up power unit such that in the event of a power failure, the master controller 16 can communicate (e.g., via the data bridge outbound link 40 and the data bridge inbound link 42) with the outside source.

In operation, the GHM receiver 34 demodulates a GHM signal received by the message controller 16 via the power line 11, and a message is determined. The message controller 36 receives the message from GHM receiver 34. If the message requires a response to the message originator, the message controller 36 generates a response message and supplies the message to GHM transmitter 32 for transmission on the power line 11. Any GHM messages that are to be forwarded beyond the domain of the substation 18 are sent to message storage device 38, and the message storage device 38 sends the messages beyond the domain of the substation 18 by sending messages via the data bridge outbound line 40. The data bridge outbound link 40 executes the protocol required for such transmission, and the protocol can include authentication and encryption. The data bridge inbound link 42 conveys both protocol information to message storage device 38 and reports control of messages forwarded by message storage device 38, e.g., message received without error-erase your copy or message not received properly-please retransmit. The data bridge inbound link 42 can also import messages from outside the domain of the substation 18. These imported messages are transferred under similar controls by messages returned on the data bridge outbound link 40.

Figure 5:
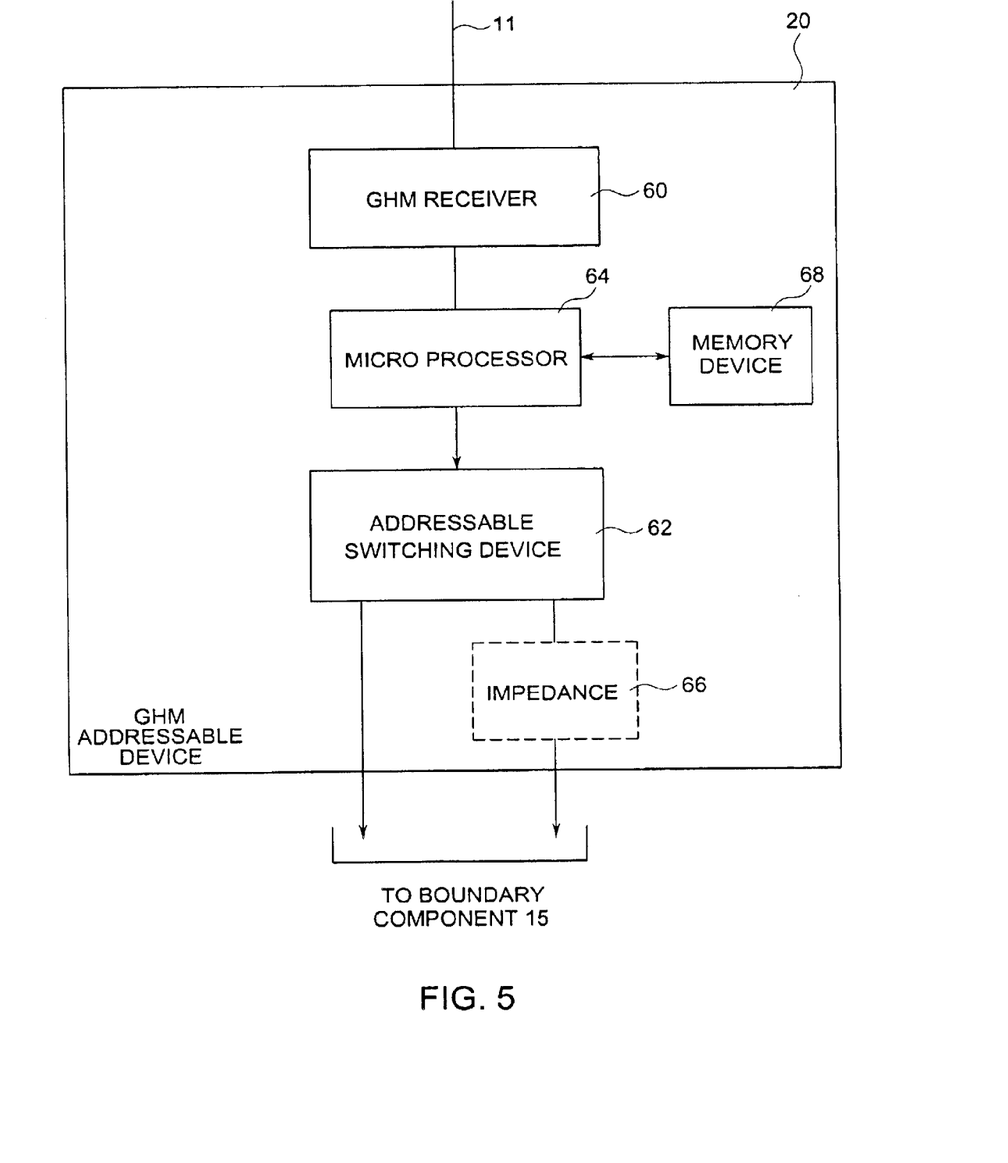
FIG. 5 is a block diagram of one representative embodiment of an addressable device.

In one embodiment shown in FIG. 5, a GHM addressable device 20 includes a GHM receiver 60 and an addressable switching device 62. In exemplary embodiment, the GHM receiver 60 comprises a modem capable of receiving a GHM signal conducted by the power line 11. The GHM addressable device 20 also includes a microprocessor 64 connected to the GHM receiver 60, memory 68 and the addressable switching device 62. In an exemplary embodiment, the memory device 68 comprises a non-volatile memory, such as, for example, an electronically erasable and programmable read only memory. In another exemplary embodiment, the memory device 68 comprises a random access memory (RAM). It should be appreciated that, in one embodiment, that the memory 68 can be included in the microprocessor 64. The GHM addressable device 20 decodes and interprets the GHM signals transmitted by via the power line 11 and coverts the GHM signals into messages. The messages are executed by the microprocessor 64 which may use the memory 68 during the execution. Upon receipt of the message, the microprocessor 64 can instruct the addressable switching device 62 to open or close. In one embodiment, the GHM signals can comprise a message include an open command or a close command and can be transmitted by the master controller 16 over the power line 11. It should be appreciated that the addressable switching device 62 can comprise, for example, a relay switch, a transistor or other types of switching devices.

The addressable switching device 62 is coupled to impedance 66 that may be connected to the capacitor bank 15, as described herein below. In one embodiment, when the boundary component 15 comprises a capacitor bank 12, the addressable switching device 62 is connected to impedance 66 that is connected in series with the capacitor bank 12. In another embodiment, when the boundary component 15 comprises an underground cable 14, the GHM addressable device 20 includes impedance 66 that is external from the underground cable 14. It should also be appreciated that other embodiments encompass the use of a capacitor bank 12 and an impedance 66 that is external from the capacitor bank 12.

In the one embodiment, the master controller 16 and the local controllers 24 comprise a GHM receiver 34 and a GHM transmitter 32 for receiving and transmitting GHM signals on the power lines 11. It should also be appreciated that meters 22 also comprise a GHM transmitter (not shown) and a GHM receiver (not shown) for transmitting and receiving GHM signals over the power lines 11. In addition, the GHM addressable device 20 contains a GHM receiver 34 that is coupled to the reconfigurable network 10 and configured to switch impedance 66 in and out of the reconfigurable network 10. These GHM addressable devices 20 receive GHM signals from meters 22 that meter the loads. Also, the GHM addressable devices 20 can alternatively receive GHM signals from master controller 16.

Figure 6:
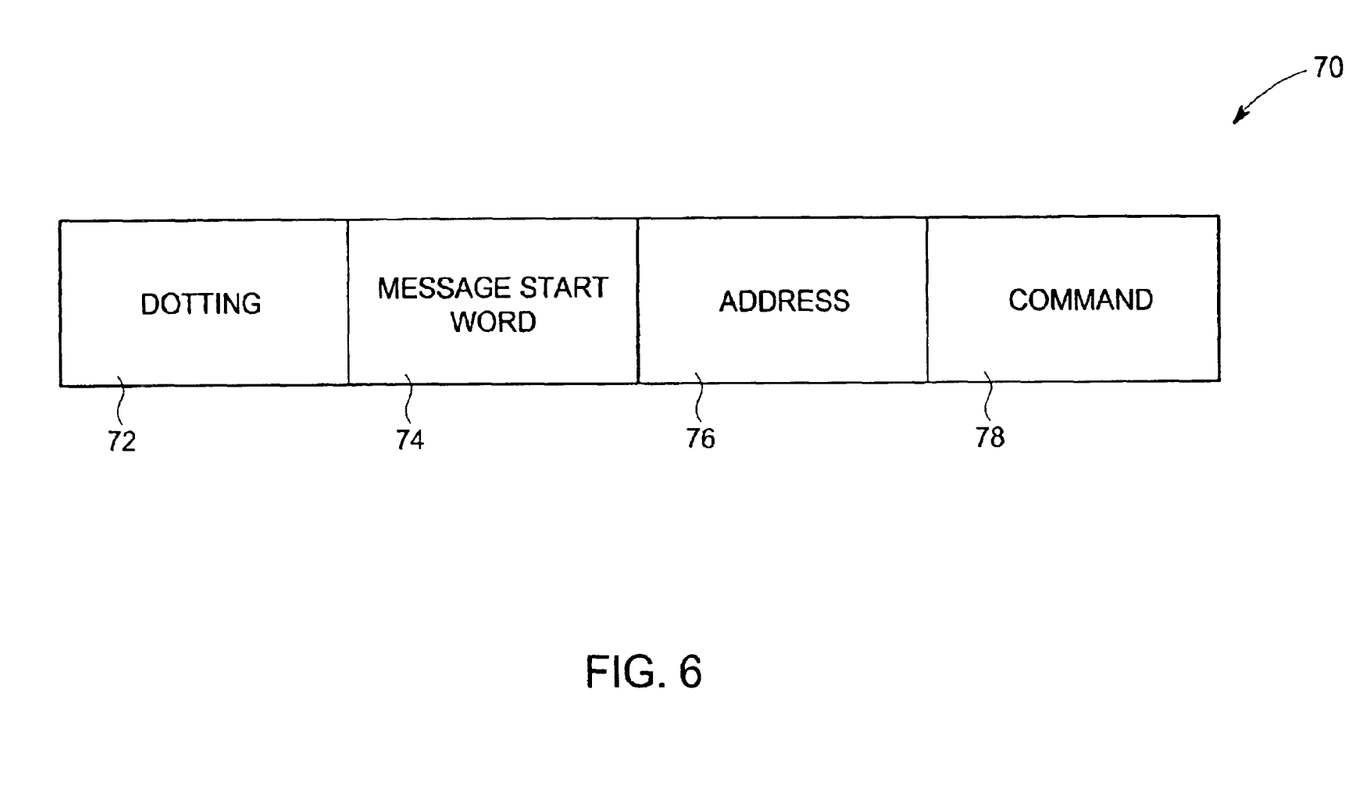
FIG. 6 is a block diagram view of one representative embodiment of a GHM message data structure.

The GHM signals can comprise a GHM message 70 as shown in FIG. 6. The GHM message 70 comprises a dotting portion 72, a message start word portion 74, an address portion 76 and a command portion 78. In one embodiment, the dotting portion 72 comprises an alternating pattern of ones and zeros (e.g., 1010101010 . . .). The pattern length of the dotting portion 72 can be chosen depending on the quality of the power line 11 and/or the communication that is available. For example, in one embodiment, the pattern length of the dotting portion 72 can range from 10 to 30 bits. The message start word portion 74 comprises a synchronization word that includes a series of bits that alert the GHM receiver 34, 60 that a GHM message is beginning and to mark the beginning boundary of the GHM message 70. The address portion 76 comprises the address or addresses of the particular GHM addressable device 20, the local controller 24 or the meter 22 that the GHM message 70 is intended. The command portion 78 comprises the code word for the action or task that is sent by the master controller 16, local controller 24 or meter 22 for which the particular GHM addressable device 20, the local controller 24 or the meter 22 should execute. In one embodiment, the command portion 78 could be sent by the master controller 16 to a GHM addressable device 20 instructing the GHM addressable device 20 to switch the impedance 66 in or out of the reconfigurable network 10.

Figure 7:
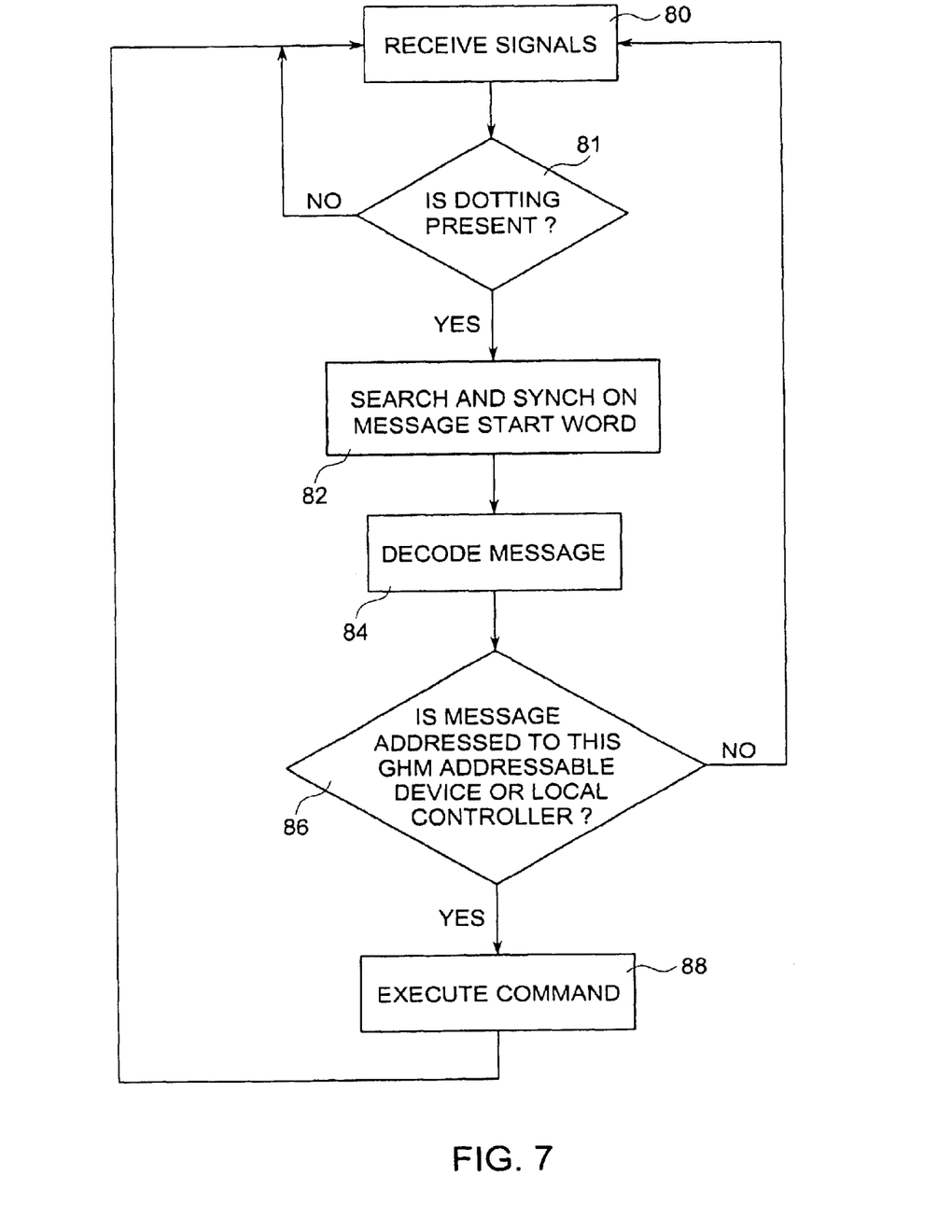
FIG. 7 is a flow diagram of one representative embodiment of a method for reconfiguring a power line communication system.

In FIG. 7, one representative embodiment for reconfiguring the reconfigurable network includes receiving signals (step 80) at the GHM addressable device 20, the local controller 24, the master controller 16 or the meters 22. The received signal is analyzed to determine if dotting is present (step 81). If dotting is not present, the received signal is discarded or ignored. If dotting is present, the GHM message 70 is searched and synched on the message start word 74 (step 82). Also, the GHM message 70 is then decoded (step 84). Then, it is determined whether the GHM message 70 is addressed to the particular GHM addressable device 20, local controller 24, master controller 16 or meter 22 (step 86) by analyzing the address portion 76 of the GHM message 70. If the GHM message 70 is not addressed to the particular GHM addressable device 20, local controller 24, master controller 16 or meter 22, the GHM message 70 is discarded or ignored. If the GHM message 70 is addressed to the particular GHM addressable device 20, local controller 24, master controller 16 or meter 22, the command in the command portion 78 of the GHM message 70 is executed (step 88). After the command is executed, the method is again repeated when a message is received again.

In operation, master controller 16 transmits GHM signals via the power line 11 from substation 18. The GHM signals can contain messages for controlling operation of GHM addressable devices 20, local controllers 24 and meters 22. From the GHM signals sent, for example, from the master controller 16, the impedance 66 can be selectively switched in and out of the reconfigurable network 10. By controlling the connection of the impedance 66 from the reconfigurable network 10, GHM signals effectively are blocked (or at least highly attenuated by the boundary component 15) so that only meters 22 upstream from the switched-out boundary component 15 receive the GHM signals. Any meters 22 downstream from the switched-out boundary component 15 do not receive the GHM signals and therefore do not perform GHM controlled operations. In one embodiment when such a region 50 is established, the master controller 16 can transmit GHM signals to the region 50 without interference from the boundary components 15 that have been switched out of the reconfigurable network 10. In another embodiment, when such a region 50 (FIG. 3) is established, a local controller 24 connected to the particular region 50 then can transmits GHM signals throughout the region 50 without concern of interference from master controller 16, local controllers 24 or other boundary components 15 that are switched out of the reconfigurable network 10.

By controlling the switching, regions 50 within the reconfigurable network 10 are established. One example in which regionalization of the reconfigurable network 10 is particularly useful is for load control operations. In load control, or shedding operations, it is often only necessary to remove certain loads located in one region 50 of the reconfigurable network 10. In one embodiment, by switching out impedances 66 at selected capacitor banks 12, a region 50 is defined so that when master controller 16 transmits a load shedding command, only those loads in the selected regions 50 are removed from the reconfigurable network 10. Regionalization also provides the benefit of permitting increased information bandwidth for local task execution. For example, a same frequency can be used simultaneously in multiple isolated regions 50.

In other embodiments of operation, the master controller 16 retains control across the reconfigurable network 10 and the addressable devices 20 are instructed to connect the impedances 66 into the reconfigurable network 10. Also in another embodiment, the reconfigurable network 10 operates in a self-organizing mode. In this mode, which is entered upon command or by program, the reconfigurable network 10 seeks to configure itself and issues commands to open and close the various isolation mechanisms (e.g., impedances 66). The GHM addressable devices 20 continue to monitor the channel (power line 11) and will reconfigure as appropriate as might be the case, for example, under fault conditions or intentional rerouting of power in the local grid.

It should be appreciated that GHM signaling on the power lines 11 could be used exclusively as described or above, or such power line communications could be used in combination with at least one of radio and telephone line communications (e.g., via radio and telephone modems). For example, if only power line communications is utilized and if master controller 16 controls the GHM addressable device 20 to switch out, a local controller 24 no longer has the ability to communicate with the rest of the reconfigurable network 10. By using radio and/or telephone communications in combination with power line communications, local controller 24 can communicate with the rest of the reconfigurable network 10 even after regionalization, and master controller 16 can configure the other portions of the reconfigurable network 10. In one embodiment, the master controller 16 can comprise a modem and the local controller 24 can comprise a modem, and the modem of the master controller 16 and the modem of the local controller 24 are communicatively connected. It should be appreciated that, in one embodiment, that the communicatively connection between the master controller 16 and the local controller 24 can include a telephone connection. In another embodiment, the master controller 16 comprises a radio frequency link and the local controller 24 also comprises a radio frequency link, and the radio frequency link of the master controller 16 and the radio frequency link of the local controller 24 are communicatively connected.

In one embodiment, if GHM communication via the power lines 11 is used exclusively, then the master controller 16 communicates with local controller 24 before regionalization. The reconfigurable network 10 is then reconfigured with master controller 16 being unable to communicate with local controllers 24. At a preset or predetermined time, the local controllers 24 switch back into the rest of the reconfigurable network 10 to enable communications with master controller 16.

The foregoing discussion of the invention has been presented for purposes of illustration and description. Further, the description is not intended to limit the invention to the form disclosed herein. Consequently, variations and modifications commensurate with the above teachings and with the skill and knowledge of the relevant art are within the scope of the present invention. The embodiment described herein above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A geometric harmonic modulation (GHM) communication system for communicating GHM signals on a power line of a reconfigurable network, the GHM communication system comprising:
    a master controller connected to the power line for transmitting GHM signals on the power line;
    a boundary component connected to the power line; and
    a GHM addressable device connected to the power line between the master controller and the boundary component, the GHM addressable device defining a boundary of a network region based on the GHM signals transmitted over the power line.

2. The GHM communication system of claim 1 wherein the master controller comprises a GHM transmitter for transmitting the GHM signals on the power line.

3. The GHM communication system of claim 1 wherein the boundary component comprises a capacitor bank, and wherein the GHM addressable device further includes an impedance connected in series with the capacitor bank.

4. The GHM communication system of claim 3 wherein the GHM addressable device comprises:
    a GHM receiver for receiving GHM signals transmitted over the power line;
    a microprocessor connected to the GHM receiver for interpreting the GHM signals; and
    an addressable switching device connected to the microprocessor and the impedance, the microprocessor controlling opening and closing of said addressable switching device according to the GHM signals received from the power line.

5. The GHM communication system of claim 1 wherein the boundary component comprises an underground cable, and wherein the GHM addressable device further comprises an impedance connected between the GHM addressable device and the underground cable.

6. The GHM communication system of claim 5 wherein the GHM addressable device comprises:
    a GHM receiver for receiving GHM signals transmitted over the power line;
    a microprocessor connected to the GHM receiver for interpreting the GHM signals; and
    an addressable switching device connected to the microprocessor and the impedance, the microprocessor controlling opening and closing of said addressable switching device according to the GHM signals received from the power line.

7. The GHM communication system of claim 1 further comprising a local controller connected to the power line, the local controller comprises a GHM receiver and a GHM transmitter for receiving and transmitting GHM signals over the power line wherein the local controller is configured to define a boundary of another network region.

8. The GHM communication system of claim 7 wherein the local controller further comprises a first modem and the master controller further comprises a second modem wherein the first modem and the second modem are communicatively coupled.

9. The GHM communication system of claim 7 wherein the local controller further comprises a first radio frequency link and the master controller further comprises a second radio frequency link wherein the first radio frequency link and the second radio frequency link are communicatively coupled.

10. The GHM communication system of claim 1 further comprising a plurality of meters coupled to the power line wherein each of said plurality of meter comprising a GHM receiver.

11. A method for reconfiguring a reconfigurable network on a power line, said method comprising the steps of:

transmitting a GHM signal on the power line;
receiving the GHM signal at a GHM addressable device;
interpreting the GHM signal at the GHM addressable device; and
establishing a network region in the reconfigurable network based on the step of interpreting the GHM signal wherein the GHM addressable device controls defining a boundary of the network region based on the GHM signals transmitted over the power line.

12. The method of claim 11 wherein the boundary component comprises a capacitor bank and the GHM addressable device comprises an impedance connected in series with the capacitor bank and the GHM addressable device further comprises an addressable switching device connected to the impedance and wherein the step of establishing a network region comprises activating the addressable switching device based on the step of interpreting the GHM signal.

13. The method of claim 11 wherein the boundary component comprises an underground cable and the GHM addressable device further comprises an impedance connected to the underground cable and the GHM addressable device further comprises an addressable switching device connected to the impedance wherein the step of establishing a network region comprises activating the addressable switching device based on the step of interpreting the GHM signal.

14. A GHM communication system for communicating GHM signals on a power line of a reconfigurable network, the GHM communication system comprising:
    a master controller connected to the power line, the master controller comprising a GHM receiver and a GHM transmitter for transmitting and receiving GHM signals on the power line;
    a local controller connected to the power line comprising a GHM receiver for receiving GHM signals from the power line and defining a boundary of a first network region based on the GHM signals transmitted over the power line;
    a boundary component connected to the power line; and
    a GHM addressable device connected to the power line between the master controller and the boundary component, the GHM addressable device comprising:
        a GHM receiver for receiving GHM signals transmitted over the power line; and
        a microprocessor connected to the GHM receiver for interpreting the GHM signals and defining a boundary of a second network region based on the GHM signals transmitted over the power line.

15. The GHM communication system of claim 14 wherein said master controller further comprises a message controller connected to the GHM transmitter and the GHM receiver and a message storage device connected to the message controller.

16. The GHM communication system of claim 14 wherein said boundary component comprises a capacitor bank and the GHM addressable device further comprises an impedance connected microprocessor and in series with the capacitor bank.

17. The GHM communication system of claim 16 wherein the GHM addressable device comprises an addressable switching device connected between the microprocessor and the impedance, the microprocessor controlling activation of the addressable switching device according to the GHM signals received from the power line to define the boundary of the second network region.

18. The GHM communication system of claim 14 wherein the boundary component comprises an underground cable and the GHM addressable device further comprises an impedance connected to the microprocessor.

19. The GHM communication system of claim 18 wherein the GHM addressable device comprises an addressable switching device connected between the microprocessor and the impedance, the microprocessor controlling activation of the addressable switching device according to the GHM signals received from the power line to define the boundary of the second network region.

20. The GHM communication system of claim 14 further comprising a plurality of meter connected to the power line wherein each of the plurality of meters comprises a GHM receiver.

21. A method for reconfiguring a reconfigurable network on a power line having at least one GHM addressable device, said method comprising the steps of:
    receiving a signal from the power line;
    determining if a dotting portion is present in the signal;
    search for a message start word portion when the dotting portion is determined to be present;
    synching on the message start word portion;
    decoding the message from the signal;
    analyzing an address portion of the decoded message; and
    executing a command portion of the message at the at least one GHM addressable device when the address portion of the message is identical to an address of the at least one GHM addressable device.

22. The method of claim 21 wherein the GHM addressable device comprises a local controller.

23. The method of claim 21 further comprising the step of establishing a network region in the reconfigurable network based on the step of executing the command portion wherein the at least one GHM addressable device defines a boundary of the network region based on the signals transmitted over the power line.

24. The method of claim 21 wherein the signal comprises a GHM signal.

25. A method for reconfiguring a reconfigurable network on a power line having at least one device, said method comprising the steps of:
    receiving a signal from the power line;
    determining if a dotting portion is present in the signal;
    search for a message start word portion when the dotting portion is determined to be present;
    synching on the message start word portion;
    decoding the message from the signal;
    analyzing an address portion of the decoded message;
    executing a command portion of the message at the at least one device when the address portion of the message is identical to an address of the at least one device; and
    establishing a network region in the reconfigurable network based on the step of executing the command portion wherein the at least one device defines a boundary of the network region based on the signals transmitted over the power line.

26. The method of claim 25 wherein the device comprises at least one of a GHM addressable device and a local controller.

* * * * *